United States Patent
Dai et al.

(10) Patent No.: US 8,090,555 B2
(45) Date of Patent: Jan. 3, 2012

(54) MULTI-ATTRIBUTE SEISMIC CHARACTERIZATION OF GAS HYDRATES

(75) Inventors: Jianchun Dai, Houston, TX (US); Niranjan Banik, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 81 days.

(21) Appl. No.: 12/142,627

(22) Filed: Jun. 19, 2008

(65) Prior Publication Data

US 2008/0319674 A1 Dec. 25, 2008

Related U.S. Application Data

(60) Provisional application No. 60/945,489, filed on Jun. 21, 2007.

(51) Int. Cl.
G06V 19/00 (2006.01)
G01V 3/38 (2006.01)
G01V 1/50 (2006.01)

(52) U.S. Cl. .................... 702/181; 702/11; 702/6
(58) Field of Classification Search .......... 702/1–8, 702/14, 18, 181; 700/93
See application file for complete search history.

(56) References Cited

U.S. PATENT DOCUMENTS

2006/0122079 A1* 6/2006 Kaneshige et al. ............ 508/591
2008/0162049 A1* 7/2008 Harris ............................ 702/11

FOREIGN PATENT DOCUMENTS

WO 2005052639 6/2005

OTHER PUBLICATIONS

Dai, et al.; "Detection and estimation of gas hydrates using rock physics and seismic inversion: Examples from the northern deepwater Gulf of Mexico"; Leading Edge (Tulsa, OK) Jan. 2004 Society of Exploration Geophysicists US, vol. 23, No. 1, Jan. 2004, pp. 60-66; XP002524331.

* cited by examiner

Primary Examiner — Michael Nghiem
Assistant Examiner — Ricky Ngon (57) ABSTRACT

An appropriate rock physics model is chosen from well-log data and/or experience. The rock physics model is then used to generate a plurality of attribute values, including compression and shear velocities, at different porosities and gas hydrate saturations. Gas hydrates are classified into different ranges of porosity and hydrate saturation based on the population of multiple attributes, and probability density functions for each individual gas hydrate class are created. Probability density distribution functions for individual attributes and a joint conditional probability density functions are created using a Bayesian function. The conditional probability of the occurrences of gas hydrate classes given a set of values of the chosen attributes derived from seismic inversion and or well measurements is inverted. Finally, a maximum a-posteriori (MAP) rule is employed to obtain the optimal porosity and hydrate saturation estimation. This information may be used to make decisions regarding management of the well site and the subsurface hydrate resources.

15 Claims, 10 Drawing Sheets

MULTI-ATTRIBUTE SEISMIC CHARACTERIZATION OF GAS HYDRATES

This application claims priority based on U.S. Provisional Patent Application Ser. No. 60/945,489, filed on Jun. 21, 2007.

BACKGROUND OF THE INVENTION

1. Field of the Invention

This application relates generally to systems and methods for the detection and quantification of gas hydrates. More specifically, this application relates to systems and methods for the detection and quantification of gas hydrate concentration and distribution from seismic data. Even more specifically, this application relates to methods, apparatus and computer usable program code for the detection and quantification of gas hydrate concentration and distribution from seismic data utilizing multiple seismic attributes in a multivariable analysis.

2. Background of the Invention

Gas hydrates are crystalline solids consisting of a gas molecules surrounded by water molecules. The structure is similar to ice, except that the crystalline structure is stabilized by the presence of the gas molecule. The two molecules are not chemically bonded, but mechanically intermingled without true chemical bonding. Gas hydrates may be formed from a number of gasses having an appropriate molecular size, including carbon dioxide, hydrogen sulfide and several low-carbon-number hydrocarbons, including methane. Natural gas hydrates are modified ice structures enclosing methane and possibly other natural gas molecules.

Gas hydrates tend to form in the pore spaces of sediment layers beneath the ocean floor. However, these hydrates may also be seen as modules or deposits of pure hydrate. Gas hydrates are stable at low temperatures and high pressures typically found in the shallow section of a deep water region, such as at water depths greater than about 500 meters. They occur in shallow sediments beneath the sea floor. The actual depth at which gas hydrates are stable may vary depending on the specific conditions at a location. Gas hydrates may also be stable in association with permafrost, both on- and off-shore. Natural gas hydrates act as a gas concentrator. For example, one unit volume of hydrate is equivalent to about 164 unit volumes of methane gas at standard conditions. Often, however, the hydrate itself is dilute in the sediment, occupying a few percents of the volume on average.

Locating likely areas of concentrated gas hydrates has therefore become an interest to those looking for alternative fuel sources. Remote seismic sensing methods have been proven useful in detecting and characterizing gas hydrates. The presence of a BSR may facilitate the detection of gas hydrates. A BSR is a high-amplitude reflector that approximately parallels the seafloor, and which results from the strong acoustic impedance contrast between the gas hydrate-bearing sediments above the reflector and the underlying sediments containing free gas. Because the BSR follows a thermobaric surface rather than a structural or stratigraphic interface, it is normally observed to crosscut other reflectors in conventional seismic section. It is also known that the existence of a BSR does not guarantee the presence of gas hydrates above it, nor does it facilitate the quantification of hydrates.

Locating gas hydrates is relatively easier than determining the relative concentrations of the gas hydrates within the subsurface rock sediment. Mathematical modeling of the ocean floor, using drill data, as well as seismic data, has improved gas hydrate detection and sensitivity. However, anomalies between results obtained using compression seismic waves (p-waves) and shear seismic waves (s-waves) individually, often yields differing results, injecting uncertainty in the detection of the gas hydrates.

SUMMARY OF THE INVENTION

In view of the above problems, an objective of the present invention is to provide systems and methods for the detection and quantification of gas hydrate concentration and distribution from seismic data utilizing multiple seismic attributes simultaneously in a multivariate analysis. An appropriate rock physics model is chosen from well-log data in the area and/or an appropriate rock physics data base. The rock physics model is then used to generate attribute values, including compression and shear velocities, at different porosities and gas hydrate saturations. Gas hydrates are classified into different ranges of porosity and hydrate saturation based on the population of attributes. Probability density functions for each individual gas hydrate class are created. Probability density distribution functions for individual attribute class and a joint conditional probability density functions are created using the Bayesian Rule. The conditional probability of the occurrences of gas hydrate classes given a set of values of the attribute values derived from seismic inversion or well measurements is inverted. Finally, a maximum a-posteriori (MAP) rule is employed to obtain the optimal porosity and hydrate saturation estimation. The results provide quantitative estimates of porosity and gas hydrate saturation. This information may be used to make decisions regarding hydrate accumulation in the subsurface and drilling any particular location.

In an alternative embodiment, an appropriate rock physics model is chosen from well-log data in the area and/or an appropriate rock physics data base. The rock physics model is then used to generate attribute values, including compression and shear velocities, at different porosities and gas hydrate saturations. Gas hydrates are classified into different ranges of porosity and hydrate saturation based on the population of attributes. From the hydrate rock physics model, functional relations between porosity and gas hydrate saturation and seismic elastic attributes are established through a multivariate regression analysis. The basic elastic attributes are acoustic velocity, shear velocity, and density, or any other set combining two or three of these three basic seismic attributes. The seismic attributes are generated through prestack seismic inversion. In one approach, the multivariate functional relations can be used to map the specific ranges of seismic attribute values to statistical mean porosity and saturation values. In another illustrative embodiment, probability density functions for each individual gas hydrate class are created. Probability density distribution functions for individual attribute class and a joint conditional probability density functions are created using the Bayesian Rule. The conditional probability of the occurrences of gas hydrate classes given a set of values of the attribute values derived from seismic inversion or well measurements is inverted. Finally, a maximum a-posteriori (MAP) rule is employed to obtain the optimal porosity and hydrate saturation estimation. The results provide quantitative estimates of porosity and gas hydrate saturation. This information may be used to make decisions regarding hydrate accumulation in the subsurface and drilling any particular location.

In yet another illustrative embodiment, the present invention provides systems and methods for the detection and quantification of gas hydrate concentration and distribution from seismic data utilizing multiple seismic attributes simultaneously in a multivariate analysis. A joint conditional probability function for a plurality of separate attributes is created using the Bayesian Rule. The plurality of separate attributes can comprise at least two of compression wave impedance, shear wave impedance, bulk density, compression wave velocity and shear wave velocity.

In yet another illustrative embodiment, the present invention provides systems and methods for the detection and quantification of gas hydrate concentration and distribution from seismic data utilizing multiple seismic attributes simultaneously in a multivariate analysis. A joint conditional probability function for a plurality of separate attributes is created using the Bayesian Rule. The detection and quantification uses a model-constrained Bayesian inversion, wherein the model-constrained Bayesian inversion can be the function:

$$p(\Phi, s_{gh}|ATR) = p(\Phi, s_{gh})_{MC} * p(ATR|\Phi, s_{gh})/p(ATR)$$

In yet another illustrative embodiment, the present invention provides systems and methods for the detection and quantification of gas hydrate concentration and distribution from seismic data utilizing multiple seismic attributes simultaneously in a multivariate analysis. A rock physics model is chosen, and a plurality of separate attributes are determined from the rock physics model. A probability density function is calculated for each of the plurality of separate attributes. A joint conditional probability function is then calculated from the plurality of probability density functions.

BRIEF DESCRIPTION OF THE DRAWINGS

The novel features believed characteristic of the invention are set forth in the appended claims. The invention itself, however, as well as an illustrative mode of use, further objectives and advantages thereof, will best be understood by reference to the following detailed description of an illustrative embodiment when read in conjunction with the accompanying drawings, wherein:

DETAILED DESCRIPTION OF THE DRAWINGS

In the following detailed description of the illustrative embodiments and other embodiments of the invention, reference is made to the accompanying drawings. It is to be understood that those of skill in the art will readily see other embodiments and changes may be made without departing from the scope of the invention.

Figure 1:
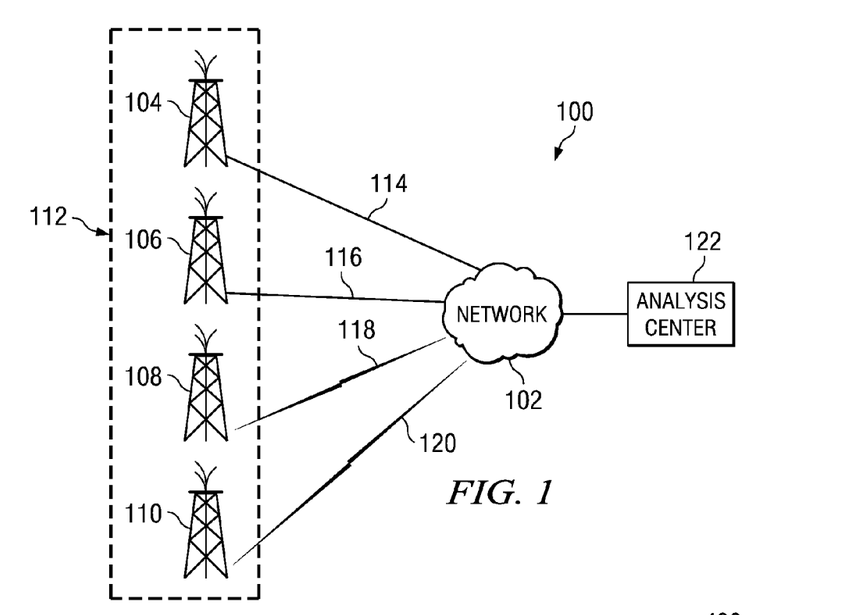
FIG. 1 is a pictorial representation of a network of data well data acquisition system in which an illustrative embodiment of the present invention may be implemented.

With reference now to FIG. 1, a pictorial representation of a network data processing system is depicted in which an illustrative embodiment of the present invention may be implemented. In this example, network data processing system 100 is a network of computing devices in which different embodiments of the present invention may be implemented. Network data processing system 100 includes network 102, which is a medium used to provide communications links between various devices and computers in communication with each other within network data processing system 100. Network 102 may include connections, such as wire, wireless communications links, or fiber optic cables. The data could even be delivered by hand with the data being stored on a storage device, such as a hard disk drive, DVD, or flash memory.

In this depicted example, well sites 104, 106, 108, and 110 have computers or other computing devices that produce data regarding wells located at these well sites. In these examples, well sites 104, 106, 108, and 110 are located in geographic region 112. This geographic region is a single reservoir, as described in these examples. Of course, these well sites may be distributed across diverse geographic regions and/or over multiple reservoirs, depending on the particular implementation. Well sites 104 and 106 have wired communications links 114 and 116 to network 102. Well sites 108 and 110 have wireless communications links 118 and 120 to network 102.

Analysis center 122 is a location at which data processing systems, such as servers are located to process data collected from well sites 104, 106, 108, and 110 and seismic data. Of course, depending on the particular implementation, multiple analysis centers may be present. These analysis centers may be, for example, at an office or an on-site in geographic location 112 depending on the particular implementation. In these illustrative embodiments, analysis center 122 analyzes data from well sites 104, 106, 108, and 110 using processes for different embodiments of the present invention.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for different embodiments. This information may be used in the management of a well site or the determination of likely sources of gas hydrates for potential drilling sites. For example, the information may be used to direct drilling operations for the well site.

The different embodiments recognize that being able to analyze all of the different types of data available from well sites is useful in identifying formations. In particular, using different types of data obtained from a well site allows for identifying heterogeneity in formations or regions over which the well site sits.

The different embodiments of the present invention provide a computer implemented method, apparatus, and computer usable program code for identifying rock heterogeneity. These embodiments also facilitate the selection of coring sampling locations based on the identified heterogeneity and solutions for various oilfield problems. In these illustrative embodiments, the heterogeneity of a formation is identified using continuous well data. This continuous well data includes, for example, well logs, measurements while drilling data, mud logs, drill cuttings, and other information that are combined to form a multi-dimensional data set. After sampling occurs, material properties are measured and these properties are associated with the multi-dimensional data. These material properties include, for example, reservoir, geochemical, petrologic, and mechanical properties. Next, models for propagating each of the measured properties along the length of the wellbore are obtained.

Also, models for predicting properties in other well sites and making decisions about the well site also may be obtained from this information. In this manner, the different illustrative embodiments allow for a construction of non-conventional three dimensional models that are based on well data for use in managing a reservoir. This information may be used for better discrimination of production sweet spots and for better guidance of drilling and production planning.

Figure 2:
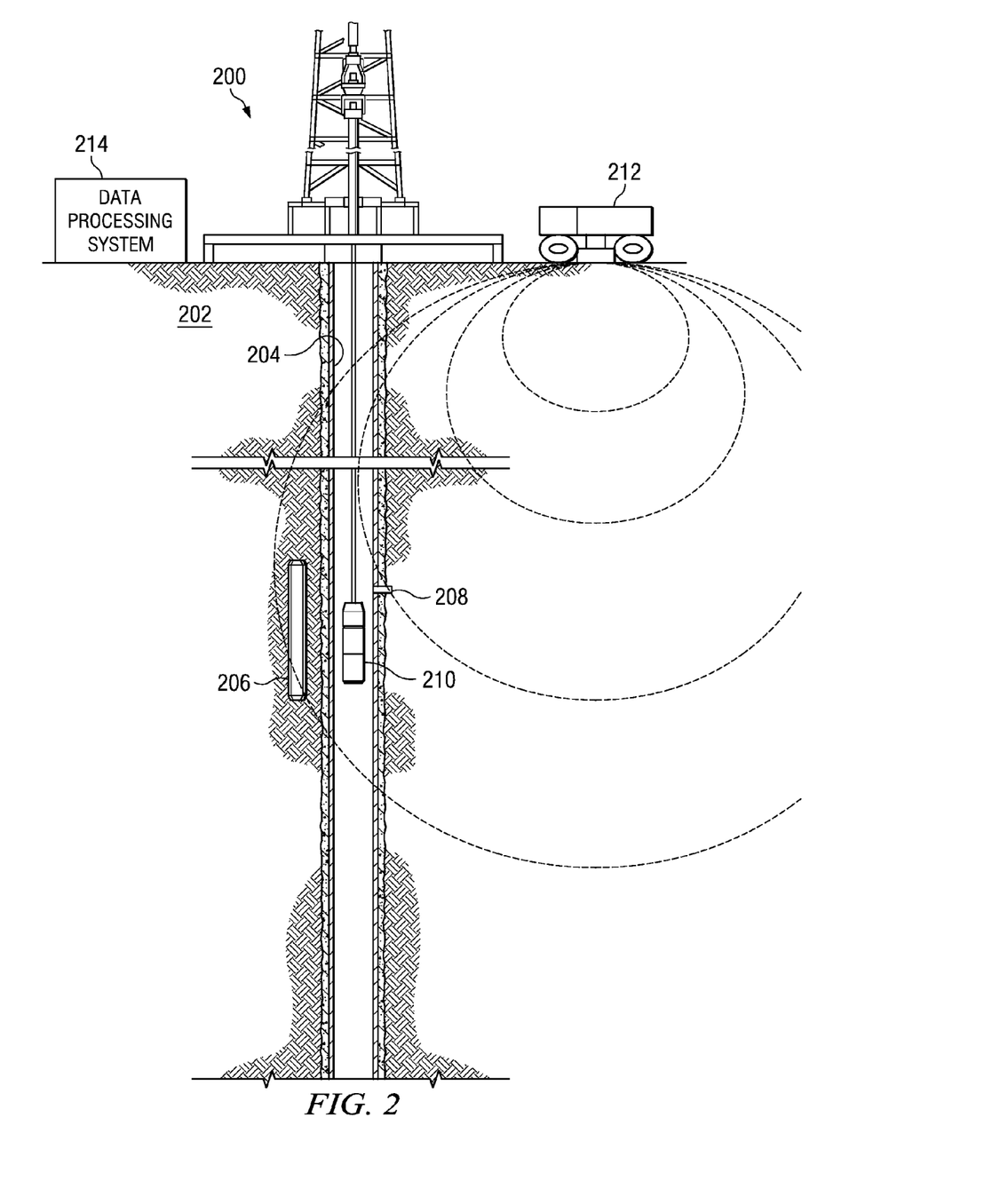
FIG. 2 is a diagram illustrating a well site from which well data is obtained, in accordance with an illustrative embodiment of the present invention.

Turning now to FIG. 2, a diagram illustrating a well site from which data is obtained is depicted, in accordance with an illustrative embodiment of the present invention. Well site 200 is an example of a well site, such as well site 104 in FIG. 1. The data obtained form well site 200 is referred to as multi-dimensional data, in these examples.

In this example, well site 200 is located on formation 202. During the creation of wellbore 204 in formation 202, different samples are obtained. For example, core sample 206 may be obtained, as well as sidewall plug 208. Further, logging tool 210 may be used to obtain other information, such as pressure measurements and factor information. Further, from creating wellbore 204, drill cuttings and mud logs are obtained.

Other information, such as seismic information also may be obtained using seismic device 212. This information may be collected by data processing system 214 and transmitted to an analysis center, such as analysis center 122 in FIG. 1 for analysis. For example, seismic measurements made by seismic device 212 may be collected by data processing system 214 and sent for further analysis.

The information collected at well site 200 may be divided into groups of continuous data and groups of discrete data. The continuous data may be well site data or laboratory data and the discrete data also may be well site data or laboratory data in these examples. Well site data is data obtained through measurements made on the well, while laboratory data is made from measurements obtained from samples from well site 200. For example, continuous well site data includes, for example, seismic, log/log suite and measurements while drilling. Continuous laboratory data includes, for example, strength profiles and core gamma information. Discrete well site data includes, for example, sidewall plugs, drill cuttings, pressure measurements, and gas flow detection measurements. The discrete laboratory data may include, for example, laboratory measurements made on plugs or cores obtained from well site 200. Of course, the different illustrative embodiments may be applied to any continuous well site data, continuous laboratory data, discrete well site data, and discrete laboratory data in addition to or in place of those illustrated in these examples.

The images of core samples and other data measured or collected by devices at well site 200 may be sent to data processing system 214 for transmission to the analysis center. More specifically, the multi-dimensional data may be input or received by data processing system 214 for transmission to an analysis center for processing. Alternatively, depending on the particular implementation some or all processing of the multi-dimensional data from well site 200 may be performed using data processing system 214. For example, data processing 214 may be used to preprocess the data or perform all of the analysis on the data from well site 200. If all the analysis is performed using data processing system 214 the results may then be transmitted to the analysis center to be combined from results of other well sites to provide additional results.

Figure 3:
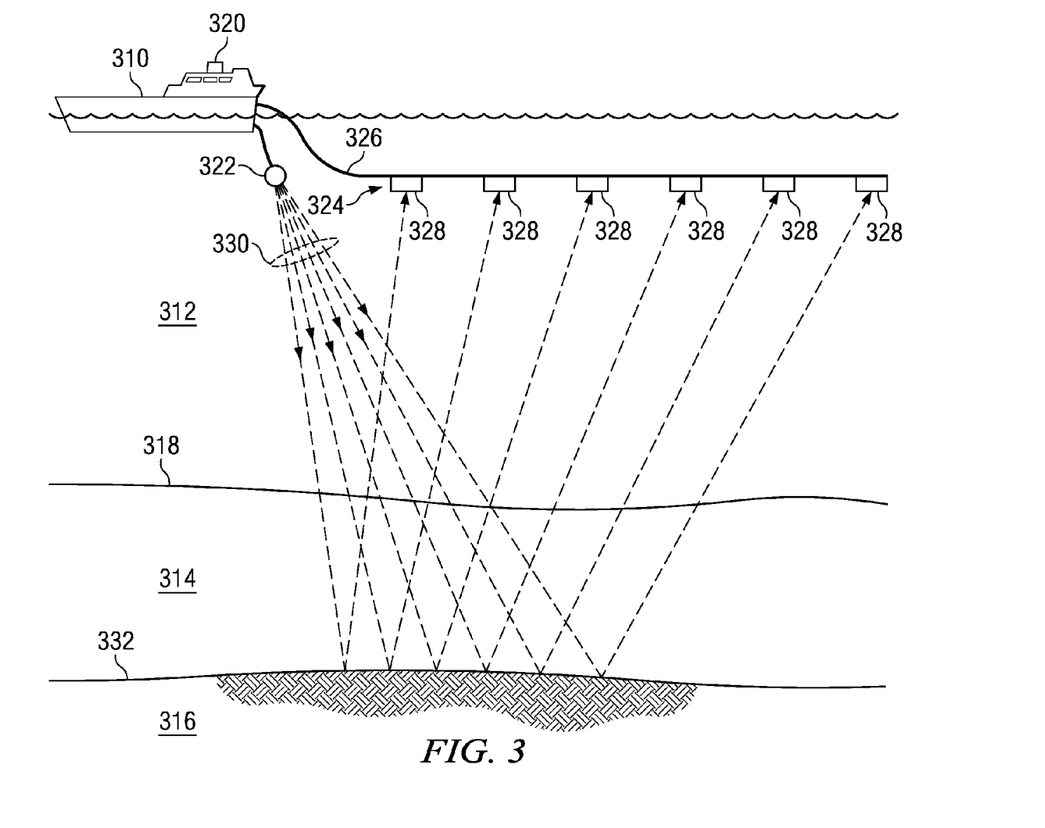
FIG. 3 is a diagram illustrating a typical arrangement for obtaining data from a marine seismic survey, in accordance with an illustrative embodiment of the present invention.

With reference now to FIG. 3, a diagram illustrating a typical arrangement for obtaining data from a marine seismic survey is shown in accordance with an illustrative embodiment of the present invention. The data collection illustrated in FIG. 3 can replace the well bore analysis data acquisition described in FIG. 1.

A seismic vessel 310 moves along the surface of a body of water 312 such as a lake or the ocean. The marine seismic survey is intended to detect and record seismic signals related to structure and composition of various subsurface Earth formations 314, 316 below the water bottom 318. The seismic vessel 310 includes source actuation, data recording and navigation equipment, shown generally at 320, referred to for convenience as a "recording system." The seismic vessel 310, or a different vessel (not shown), can tow one or more seismic energy sources 322, or arrays of such source(s) in the water 312. The system includes at least one seismic streamer 324, which includes a strength member 326 operatively coupled to the seismic vessel 310, and a plurality of sensors 328 or arrays of such sensors, disposed at spaced apart locations along the streamer 324. During operation, equipment (not shown separately) in the recording system 320 causes the source 322 to actuate at selected times. When actuated, the source 322 produces seismic energy 330 that emanates generally outwardly from the source 322. The energy 330 travels downwardly, through the water 312, and passes, at least in part, through the water bottom 318 into the formations 314, 316 below the water bottom 318. Seismic energy 330 can be reflected from one or more acoustic impedance boundaries 332 below the water bottom 318, and travels upwardly whereupon it may be detected by the sensors 328. The structure and composition of the formations 314, 316, including gas hydrate saturation levels can be inferred by travel time of the energy 330 and by characteristics of the detected energy such as its amplitude and phase.

Figure 4:
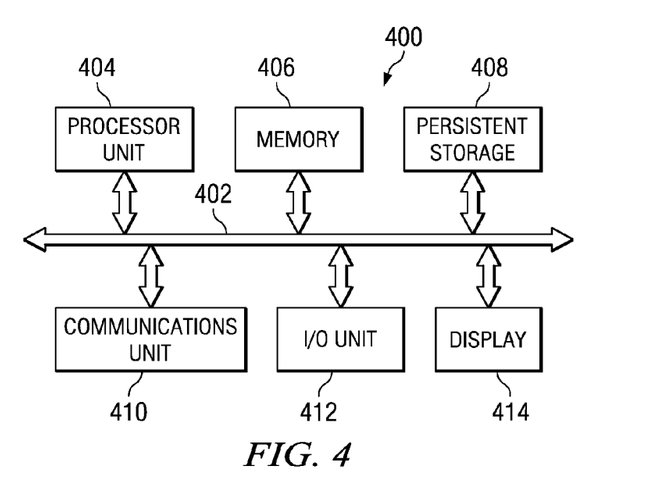
FIG. 4 is a block diagram of a data processing system in which aspects of the illustrative embodiments may be implemented.

Turning now to FIG. 4, a diagram of a data processing system is depicted, in accordance with an advantageous embodiment of the present invention. Data processing system 400 is an example of a data processing system that may be used to implement data processing system 214 in FIG. 2. Further, the different computing devices found at other well sites and at analysis center 122 in FIG. 1 may be implemented using data processing system 400. In this illustrative example, data processing system 400 includes communications fabric 402, which provides communications between processor unit 404, memory 406, persistent storage 408, communications unit 410, I/O unit 412, and display 414.

Processor unit 404 executes instructions for software that may be loaded into memory 406. Processor unit 404 may be a set of one or more processors or may be a multi-processor core, depending on the particular implementation. Further, processor unit 406 may be implemented using one or more heterogeneous processor systems, in which a main processor is present with secondary processors on a single chip. Memory 406, in these examples, may be, for example, a random access memory. Persistent storage 408 may take various forms depending on the particular implementation. For example, persistent storage 408 may be, for example, a hard drive, a flash memory, a rewritable optical disk, a rewritable magnetic tape, or some combination of the above.

Communications unit 410, in these examples, provides for communications with other data processing systems or devices. In these examples, communications unit 410 is a network interface card. I/O unit 412 allows for input and output of data with other devices that may be connected to data processing system 400. For example, I/O unit 412 may provide a connection for user input though a keyboard and mouse. Further, I/O unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406.

The different embodiments allow for analyzing data from different sources, such as data obtained from well site 200 in FIG. 2, to identify different layers in a formation. In other words, the different embodiments allow for identifying the heterogeneity of a formation. In the illustrative examples, this identification is made using continuous well data, such as the continuous well data that is obtained from well site 200 in FIG. 2. More specifically, the different embodiments use cluster analysis to identify patterns in multi-dimensional data about a region in the ground to identify rock heterogeneity. In other words, this information from the well site allows for the identification of different regions or groupings within a formation. In these examples, the identification of different regions may be in other zones or structures other than a formation in the ground. In these illustrative examples, a zone is some selected cross-section in the ground or some three dimensional zone in the ground. A zone may include an entire formation, portion of formation, or other structures. In other words, a zone may cover any part of the earth under the ground. The identification of zones with similar and dissimilar material properties may be identified through this type of analysis.

After the identification of the heterogeneity of formation is obtained, an identification of the properties of the different regions within the formation may be made. The identification may be made using the multi-dimensional data already collected from the well site. Alternatively, sampling of the different layers or groupings may be made for analysis of the properties. This sampling may be made through, for example, coring, sidewall plugging, or cuttings. The properties of the samples are measured and may be associated with the multi-dimensional data to identify the properties for different regions within a formation. These regions are also referred to as cluster units in the different embodiments. Further, this information also is used to make decisions about the management of the well site.

Figure 5:
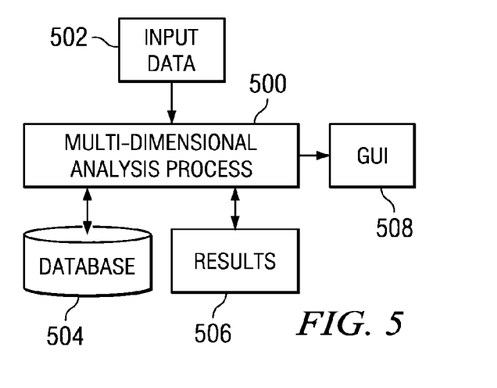
FIG. 5 is a diagram illustrating components used to analyze multi-dimensional data from one or more well sites, in accordance with an illustrative embodiment of the present invention.

With reference now to FIG. 5, a diagram illustrating components used to analyze multi-dimensional data from one or more well sites is depicted, in accordance with an illustrative embodiment of the present invention. Multi-dimensional analysis process 500 may execute on a data processing system, such as data processing system 400 in FIG. 4. Multi-dimensional analysis process 500 receives input data 502 and stores input data 502 in database 504. In these illustrative examples, input data 502 takes the form of multi-dimensional data obtained from a well site, such as well site 200 in FIG. 2. This input data may take various forms, such as, for example, continuous data and discrete data for the well site. Database 504 may be implemented using a currently existing database system. In these examples, database 504 may take the form of a sequential query language (SQL) database.

Multi-dimensional analysis process 500 analyzes the data in database 504 to generate results 506. More specifically, in these embodiments, multi-dimensional analysis process 500 contains the different processes to perform cluster analysis on input data 502 stored in database 504. Multi-dimensional analysis process 500 identifies different regions with similar and dissimilar properties. This software component also may be used to associate measured properties of the different regions and associate those properties with input data 502 in a manner that allows for an identification of the different regions. For example, input data 502 may include continuous well data, such as well logs, measurements while drilling, mud logs, and drill cuttings.

In identifying the similar and dissimilar properties for different regions using cluster analysis, multi-dimensional analysis process 500 identifies the different regions using the continuous well data in the multi-dimensional data set in these illustrative embodiments. In other words, the different types of regions or cluster units under the well site along the wellbore are identified, but not the properties of these regions or cluster units. In these examples, the actual property for identification of the region is not made during this portion of the process. For example, reservoir, geochemical, petrologic, and mechanical properties are not identified through this process. These types of properties are identified subsequently using sampling or other well site data.

After the identification of regions is made, multi-dimensional analysis process 500 may then use multi-dimensional data gathered from the well site to identify properties for these different regions. These properties may include, for example, reservoir, geochemical, petrologic, and mechanical properties. Multi-dimensional analysis process 500 then associates these properties with results 506. The association of the properties with results 506 creates a model of the different regions below the well site and along the length of the wellbore. These results may be verified through the performed sampling at the various regions within the borehole. When these different regions are identified, a sampling of data for these different regions may made through techniques, such as coring, sidewall plugging, or cuttings for further verification of these results. The material properties of these samples may be measured. These material properties are properties of the particular region from which the sample is taken.

With this association, a model may be generated to propagate the measured properties along the length of the well from which input data 502 was obtained. This model may be used to predict properties for other wells and for making decisions about the current well site.

The control of multi-dimensional analysis process 500 and the presentation of results 506 are made using graphical user interface (GUI) 508. Graphical user interface 508 allows a user to see and interpret the different results. Additionally, graphical user interface 508 also allows a user to change parameters used to analyze input data 502. With results 506, three dimensional scale models may be constructed based on the well data to allow for better discrimination in production, such as identifying sweet spots. Further, better guidance for drilling and production planning also may be made with the models generated in results 506.

Figure 6:
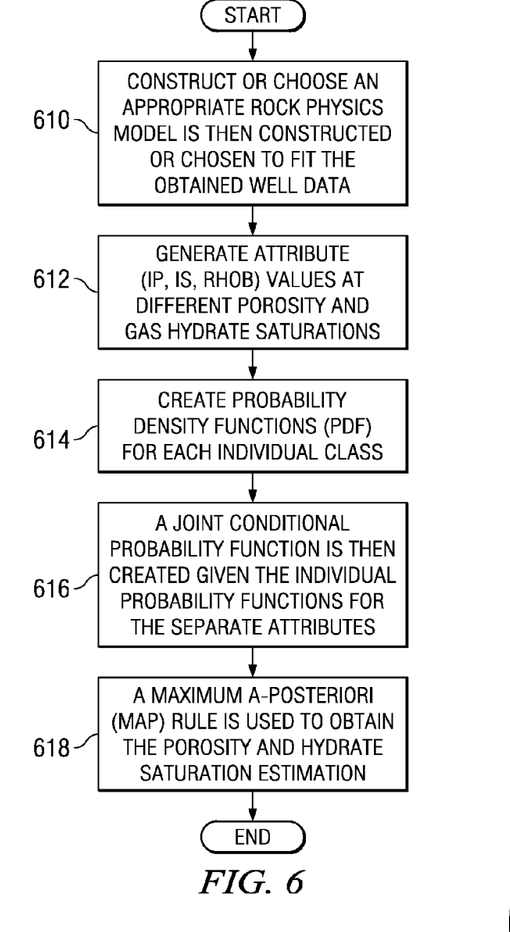
FIG. 6 is a flowchart of a process for detecting gas hydrates and quantifying gas hydrate saturation utilizing a multi-attribute seismic analysis method, in accordance with an illustrative embodiment of the present invention.

With reference now to FIG. 6, a flowchart of a process for detecting gas hydrates and quantifying gas hydrate saturation utilizing a multi-attribute seismic analysis method is depicted, in accordance with an illustrative embodiment of the present invention. The process illustrated in FIG. 6 may be implemented manually and/or in a data processing system. When implemented using a data processing system, the components illustrated in FIGS. 3, 4 and 5 are the software and hardware components that may be used to implement the process.

The process begins by constructing or choosing an appropriate rock physics model, which is then constructed or chosen to fit the obtained well data (step 610). This seismic data and well data can be data from a well site, such as well site 200 in FIG. 2 or from one or more seismic survey sites independent of a well. Various well and seismic data can include acoustic, shear, and density data or any geo-physically meaningful combination of these parameters.

Because of the consistent relationship between the rock seismic properties and gas hydrate saturations in the sediments that has been demonstrated, accurate modeling of well data into a known model can generally be accomplished.

With reference now to FIGS. 7-12, a number of known rock physics models are shown after which well data can be patterned, in accordance with an illustrative embodiment of the present invention. Additional models may be used.

Figure 7:
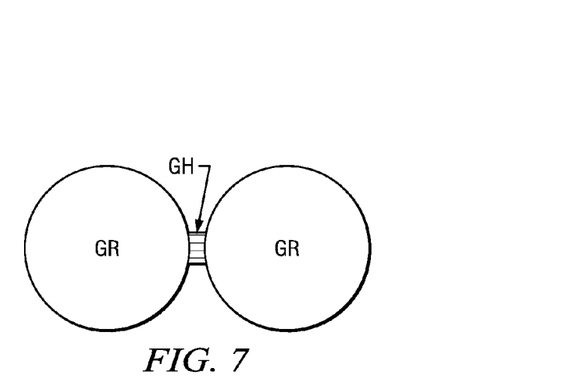
FIG. 7 is a rock physics model after which well data can be patterned, in accordance with an illustrative embodiment of the present invention.

FIG. 7 depicts cementation models first described by Dvorkin and Nur. The rock physics model of FIG. 7 treats rock sedimentation as randomly packed spheres. Gas hydrates occur at the contact points within the sedimentation. The rock physics model of FIG. 8 also treats rock sedimentation as randomly packed spheres. However, unlike the model of FIG. 7, gas hydrates in the model of FIG. 8 form as an outer coating around the rock sedimentation. At low concentrations, these models predict that a small increase in gas hydrates will have a large increase on the seismic properties—namely p-wave and s-wave velocities of the rock. However, as the concentration of gas hydrate increases further, the models predict a smaller increase in the velocities of p-waves and s-waves.

Figure 8:
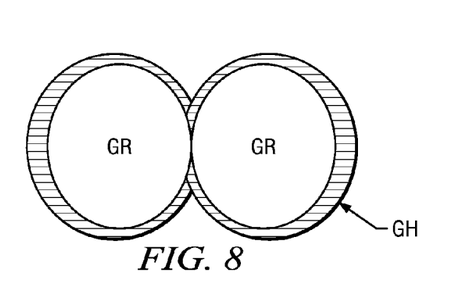
FIG. 8 is a rock physics model after which well data can be patterned, in accordance with an illustrative embodiment of the present invention.
Figure 13:
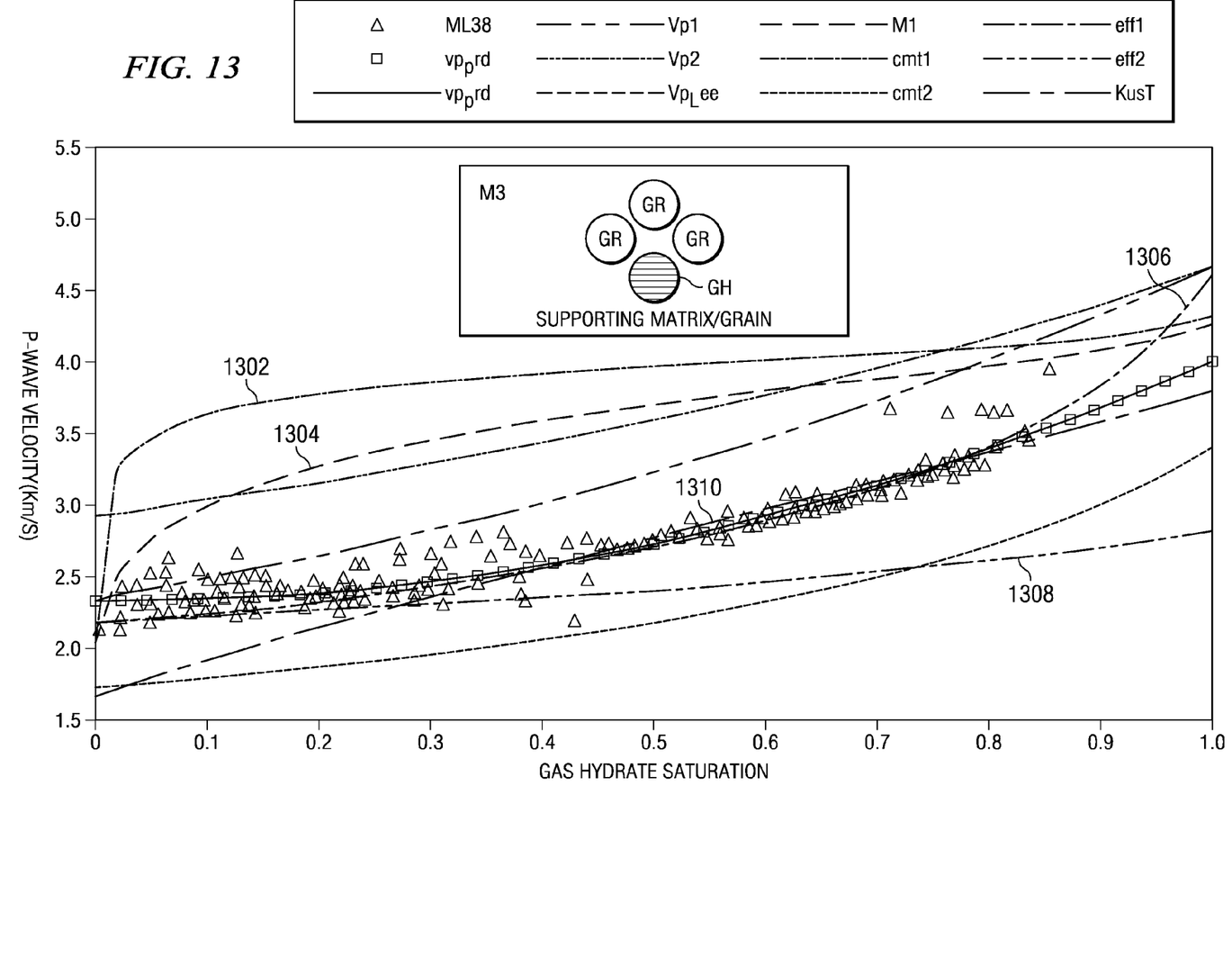
FIG. 13 is a graphical representation of the compression wave velocities of the various rock physics models depicted in FIGS. 6-11, in accordance with an illustrative embodiment of the present invention.

The P-wave velocity profile for the model of FIG. 7 is shown in 1302 of FIG. 13. The S-wave velocity profile for the model of FIG. 7 is shown in 1402 of FIG. 14. The P-wave velocity profile for the model of FIG. 8 is shown in 1304 of FIG. 13. The S-wave velocity profile for the model of FIG. 8 is shown in 1404 of FIG. 14.

Figure 9:
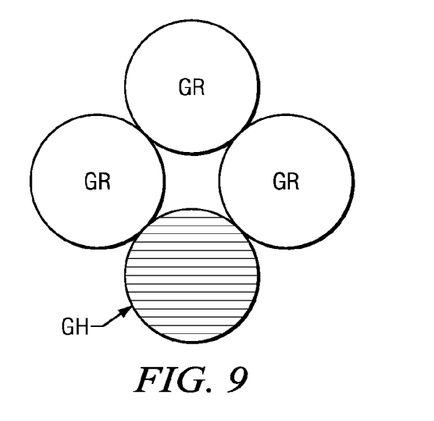
FIG. 9 is a rock physics model after which well data can be patterned, in accordance with an illustrative embodiment of the present invention.

The model disclosed in FIG. 9, first proposed by Dvorkin, depicts gas hydrates as components of the load-bearing rock matrix and are incorporated into the rock sedimentation. Moduli of P-waves and S-waves are first calculated through dry rock at critical porosity, using a Hertz-Mindlin contact theory. Modified Hashin-Shtrikman (HS) boundaries are used for porosities greater or less than the critical porosity. Modeled P-wave and S-wave velocities for the composite rock can then be derived from a Biot-Gassmann equation. The P-wave velocity profile for the model of FIG. 9 is shown in 1306 of FIG. 13. The S-wave velocity profile for the model of FIG. 9 is shown in 1406 of FIG. 14.

Figure 10:
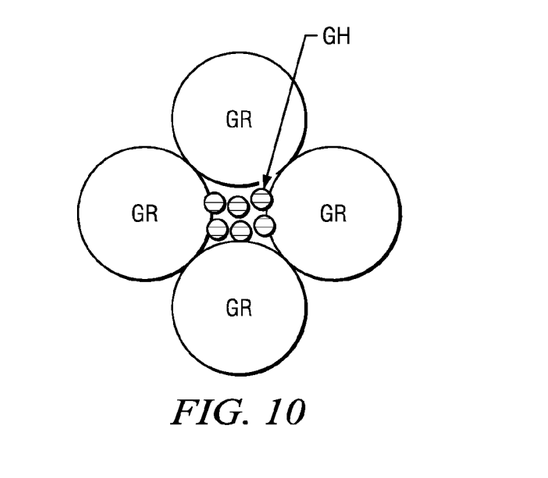
FIG. 10 is a rock physics model after which well data can be patterned, in accordance with an illustrative embodiment of the present invention.

The model disclosed in FIG. 10, first proposed by Helgerud, depicts gas hydrates as filling the pores within the rock matrix. Moduli of P-waves and S-waves are first calculated through dry rock at critical porosity, using a Hertz-Mindlin contact theory. Modified Hashin-Shtrikman (HS) bounds are used for porosities greater or less than the critical porosity. Modeled P-wave and S-wave velocities for the composite rock are then derived from a Biot-Gassmann equation appropriate for gas hydrates substitution. The P-wave velocity profile for the model of FIG. 10 is shown in 1308 of FIG. 13. The S-wave velocity profile for the model of FIG. 10 is shown in 1408 of FIG. 14.

Figure 11:
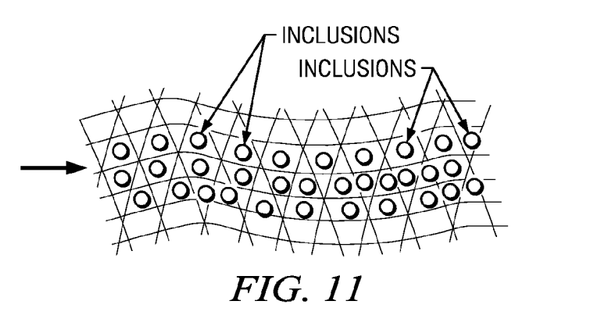
FIG. 11 is a rock physics model-after which well data can be patterned, in accordance with an illustrative embodiment of the present invention.

The model disclosed in FIG. 11 is an inclusion-type model that treats gas hydrate as the matrix and rock sedimentation as inclusions within the matrix. By iteratively solving either the inclusion-type or self-consistent type equations for the model, P-wave and S-wave moduli of the system can be calculated. The P-wave velocity profile for the model of FIG. 11 is shown in 1310 of FIG. 13. The S-wave velocity profile for the model of FIG. 11 is shown in 1410 of FIG. 14.

Figure 12:
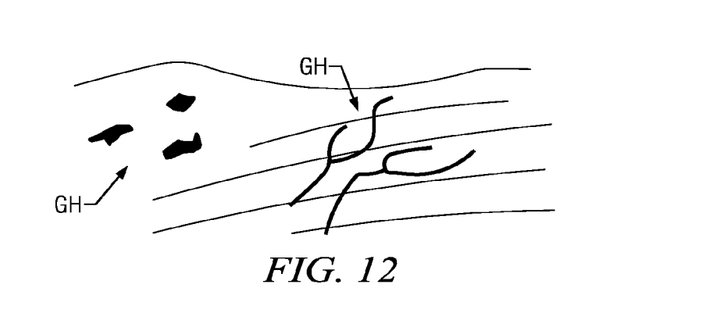
FIG. 12 is a rock physics model after which well data can be patterned, in accordance with an illustrative embodiment of the present invention.

The model disclosed in FIG. 12 depicts gas hydrates existing in modules and fractures. As of yet, no one has provided any quantitative treatment of this geometric model. Therefore, the P-wave and S-wave profiles of the model of FIG. 12 are not shown in FIG. 13 and FIG. 14, respectively.

Well site data is modeled or constructed into an appropriate rock physics model. For purposes of the illustrative example, the model disclosed in FIG. 11 is used. Selection of FIG. 11 is not limited, but is only provided for ease of explanation. Actual model selection or construction will vary depending on, among other things, rock composition and the gas hydrate saturation. The disclosed methods and systems can be utilized with any model under these varieties of circumstances.

Referring again to FIG. 6, the model constructed in step 610 is used to generate attribute (Ip, Is, Rhob) values at different porosity and gas hydrate saturations (step 612). That is, seismic attributes can be expressed as a function of porosity ($\Phi$) and gas hydrate saturation ($s_{gh}$). This is shown generically as:

$$p(ATR|\Phi, s_{gh})$$

P-wave impedance is related to measured physical parameters by the equation:

$$Ip = V_p * \rho$$

$$Ip = \sqrt{(\rho_{bulk}(K_{sat} + 4G/3))}$$

$\rho_{bulk}$ is the bulk density of the sediment, $K_{sat}$ is the bulk modulus of the saturated rock, and G is the shear modulus of the dry rock.

S-wave impedance is related to measured physical parameters by the equation:

$$Is = V_s * \rho$$

$$Is = \sqrt{(\rho_{bulk} G)}$$

$\rho_{bulk}$ is the bulk density of the sediment and G is the shear modulus of the rock.

FIG. 13 is a graphical representation of the compression wave velocities of the various rock physics model depicted in FIGS. 7-12, in accordance with an illustrative embodiment of the present invention.

Figure 14:
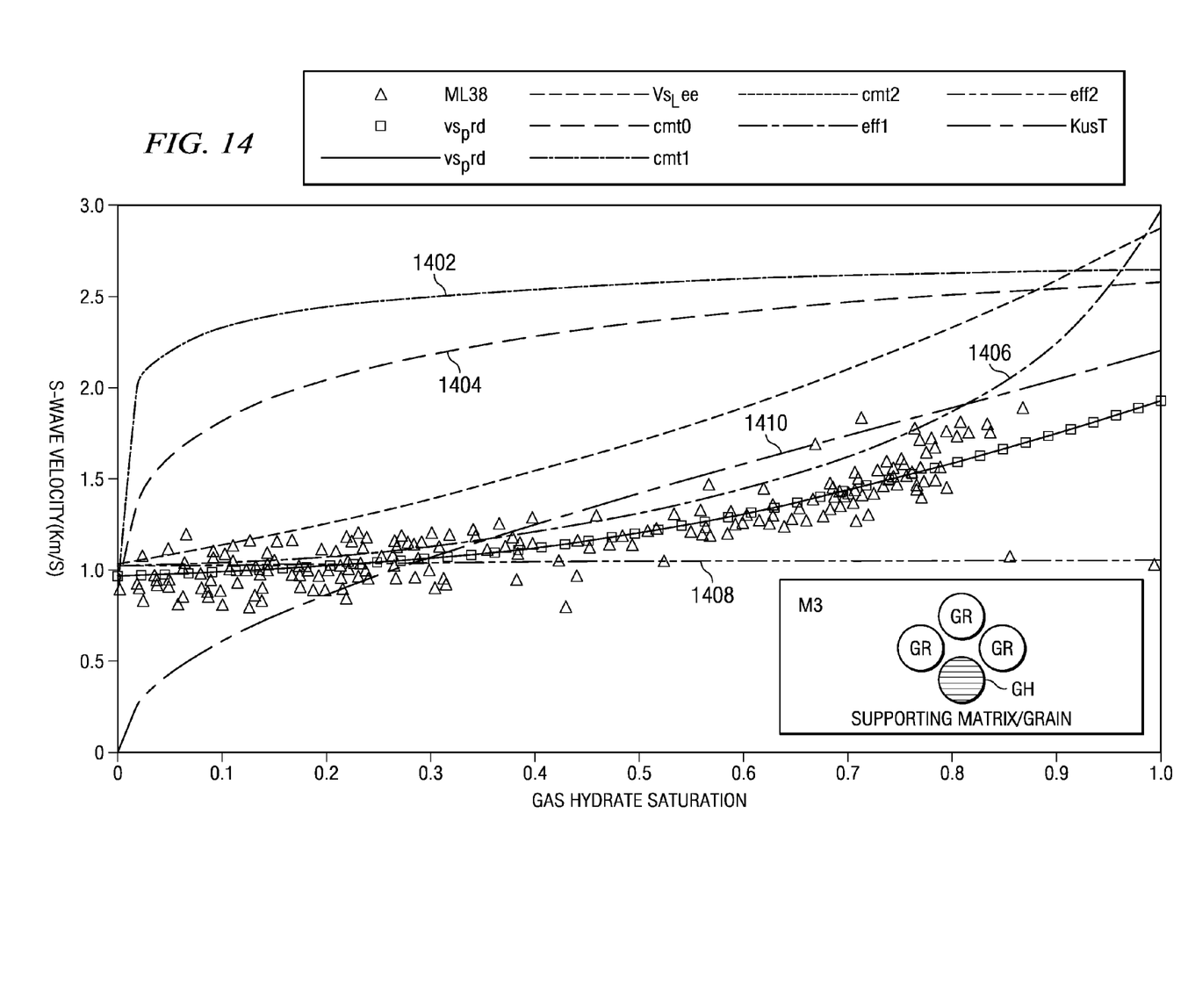
FIG. 14 is a graphical representation of the shear wave velocities of the various rock physics models depicted in FIGS. 6-11, in accordance with an illustrative embodiment of the present invention.

FIG. 14 is a graphical representation of the shear wave velocities of the various rock physics models depicted in FIGS. 7-12, in accordance with an illustrative embodiment of the present invention.

Referring again to FIG. 6, gas hydrates are then classified according to different ranges of porosity and hydrate saturation based on the population of attributes generated in step 612, and create probability density functions (pdf) for each individual class (step 614). (For the standard multivariate regression, we develop mathematical trend functions.) Probability density distribution functions for individual attributes are created, and then the multivariable, joint conditional probability density functions are created using a Bayesian function, given the individual probability density functions.

Figure 15:
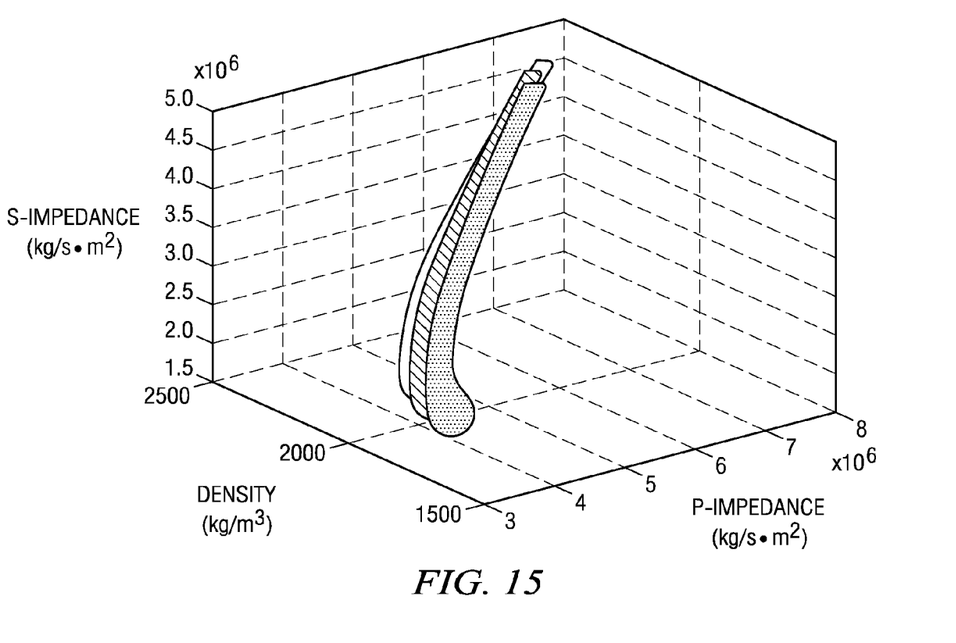
FIG. 15 shows an exemplary probability density, in accordance with an illustrative embodiment of the present invention.

Exemplary probability density functions (pdf) for each individual class are shown in FIG. 15. FIG. 15 shows an exemplary pdf for all gas hydrate classes with the corresponding individual attributes, including the various lithology units in the 3D space as defined by seismic wave velocities.

Referring again to FIG. 6, a joint conditional probability function is then created given the individual probability functions for the separate attributes (Step 616). To derive the joint probability density function for the porosity and the saturation, a model-constrained Bayesian inversion is applied to the conditional probability density functions for the seismic attributes. This is shown by the function:

$$p(\Phi, s_{gh}|ATR) = p(\Phi, s_{gh})_{MC} * p(ATR|\Phi, s_{gh})/p(ATR).$$

By combining attributes of acoustic impedance, shear impedance, and density based on the selected model into a single, multivariable function, a more robust and accurate determination of gas hydrate densities can be obtained. One stable set of results is obtained with the functions outlined above.

Gas hydrates with different ranges of porosity and hydrate saturation are then classified based on the population of attributes, and probability density functions (pdf) are created for each individual class. Probability density distribution functions for individual attributes are created, and then the joint conditional probability density functions are created using the Bayesian Rule, given the individual probability density functions.

Figure 16:
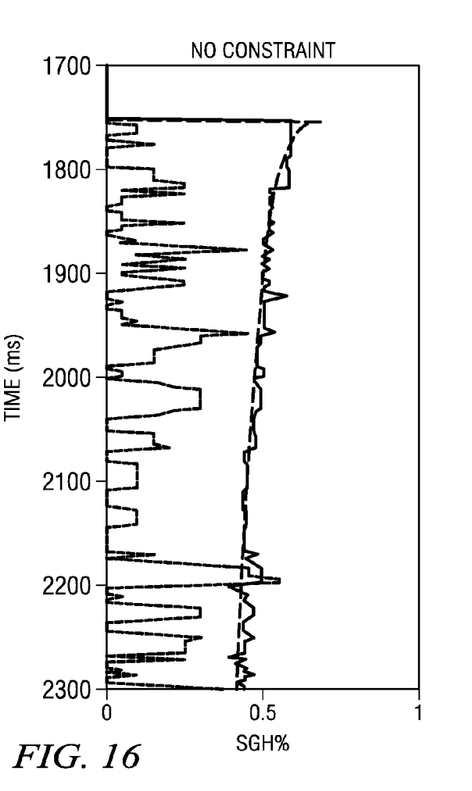
FIG. 16 is a graphical representation showing porosity and hydrate saturation for an exemplary unconstrained Bayesian Inversions.
Figure 17:
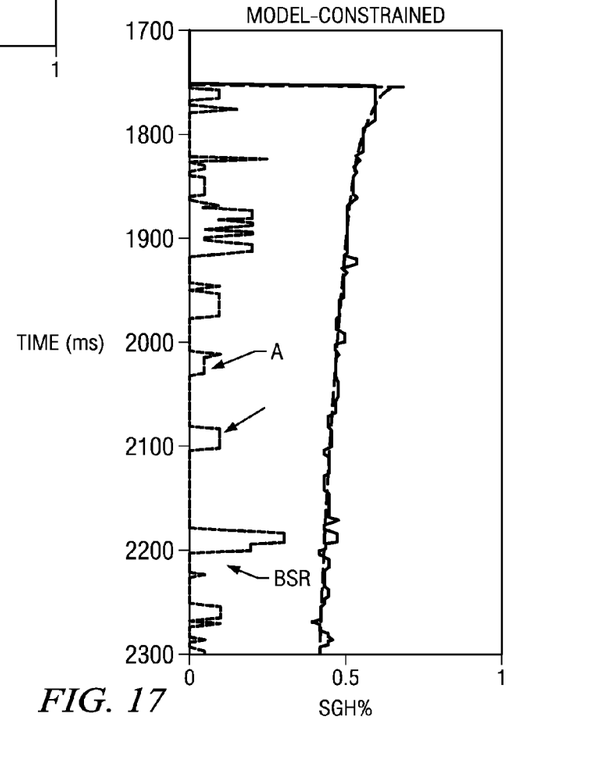
FIG. 17 is a graphical representation showing porosity and hydrate saturation for an exemplary model constrained Bayesian Inversions.

Referring now to FIG. 16 and FIG. 17, porosity and hydrate saturation is shown for unconstrained and model constrained Bayesian Inversions. When comparing the two graphs, it can be seen that the model constrained graph shown in FIG. 18 has less variation in measurement than does the unconstrained model. This results in a more accurate graph and consequently, more accurate determination of the gas hydrate saturation of the sample.

Referring again to FIG. 6, a maximum a-posteriori (MAP) rule is used to obtain the porosity and hydrate saturation estimation (step 618). The MAP rule minimizes the risks and helps obtain optimal results in the sense that it reduces the uncertainty of the hit-or-miss associated with prediction of the correct value within an interval. This can be expressed as:

$$|\Phi, s\hat{w}| = \arg\max p(\Phi, sw|ATR)$$

The Bayesian function provides a measure of the uncertainty associated with the MAP estimation of porosity and saturation. Running uncertainty analysis on a selected inline or a well trajectory is not expensive and provides valuable insight into the uncertainty associated with the inversion.

While the invention has been described as utilizing a MAP estimation of porosity and saturation, standard regression based analysis can also be utilized to determine porosity and saturation levels for the standard regression based multi-variate analysis.

Figure 18:
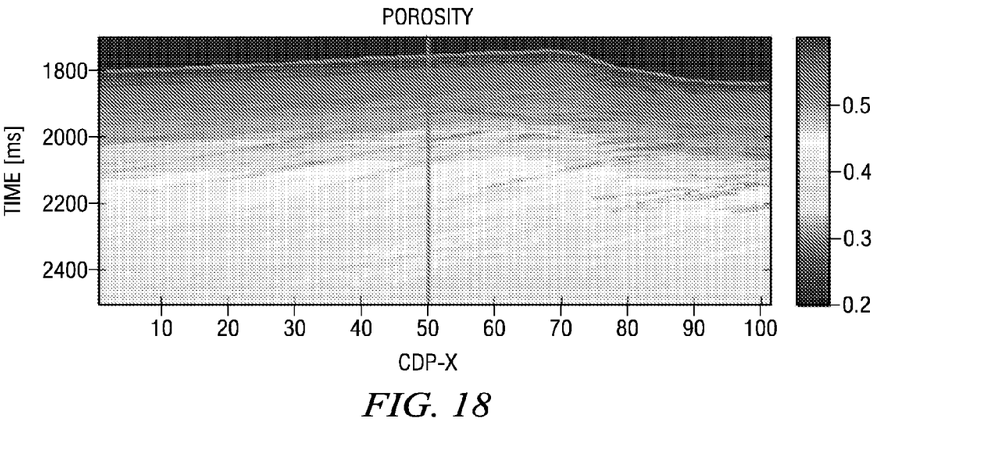
FIG. 18 is the porosity of an exemplary sample, as estimated by the MAP function utilizing the model-constrained Bayesian inversion, according to an illustrative embodiment of the invention.

Referring now to FIG. 18, the porosity of an exemplary sample is shown, as estimated by the MAP function utilizing the model-constrained Bayesian inversion, according to an illustrative embodiment of the invention.

Figure 19:
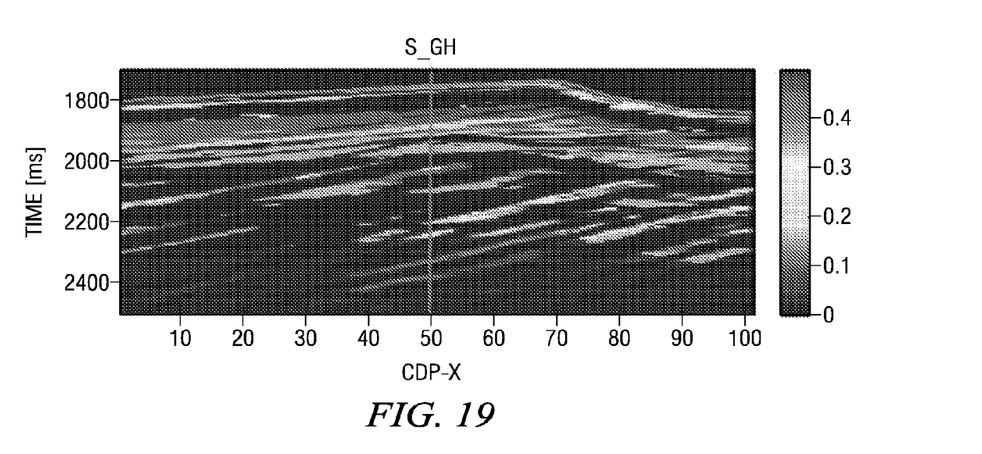
FIG. 19 is the gas hydrate saturation of an exemplary sample, as estimated by the MAP function utilizing the model-constrained Bayesian inversion, according to an illustrative embodiment of the invention.

Referring now to FIG. 19, the gas hydrate saturation of an exemplary sample is shown, as estimated by the MAP function utilizing the model-constrained Bayesian inversion, according to an illustrative embodiment of the invention.

Thus, the different embodiments of the present invention provide systems and methods for the detection and quantification of gas hydrate concentration and distribution from seismic data utilizing multiple seismic attributes in a multi-variable analysis. An appropriate rock physics model is chosen from well-log data and/or experience. The rock physics model is then used to generate attribute values, including compression and shear velocities, at different porosities and gas hydrate saturations. Gas hydrates are classified into different ranges of porosity and hydrate saturation based on the population of attributes. Probability density functions for each individual gas hydrate class are created. Probability density distribution functions for individual attributes and a joint conditional probability density functions are created using a Bayesian function. The conditional probability of the occurrences of gas hydrate classes given a set of values of the attribute values derived from seismic inversion or well measurements is inverted. Finally, a maximum a-posteriori (MAP) rule is employed to obtain the optimal porosity and hydrate saturation estimation. This information may be used to make decisions regarding management of the well site.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially, concurrently, or the blocks may sometimes be executed in the reverse order, depending upon the functionality involved.

The invention can take the form of an entirely hardware embodiment, an entirely software embodiment or an embodiment containing both hardware and software elements. In an illustrative embodiment, the invention is implemented in software, which includes, but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Although the foregoing is provided for purposes of illustrating, explaining and describing certain embodiments of the invention in particular detail, modifications and adaptations to the described methods, systems and other embodiments will be apparent to those skilled in the art and may be made without departing from the scope or spirit of the invention.

What is claimed is:

1. A computer program product comprising a non-transitory computer readable medium having computer-readable program code embodied thereon adapted to be executed to implement a method, the method comprising:
    generating separate attributes at different porosity and gas hydrate saturations utilizing a rock physics model corresponding to data associated with a formation region;
    creating individual gas hydrate classes according to the different porosity and gas hydrate saturations based on the population of the separate attributes;
    calculating a probability density function for each of the individual gas hydrate classes;
    creating a joint conditional probability function given the probability density functions for the individual gas hydrate classes for the separate attributes; and
    generating a hydrate concentration and distribution estimate for the formation region.

2. The computer program product of claim 1, wherein the plurality of separate attributes comprises at least two of compression wave impedance, shear wave impedance, bulk density, compression wave velocity and shear wave velocity.

3. The computer program product of claim 1, wherein the joint conditional probability function uses a model-constrained Bayesian inversion.

4. The computer program product of claim 3, wherein the model-constrained Bayesian inversion is the function:

$$p(\Phi, s_{gh}|ATR) = p(\Phi, s_{gh})_{MC} * p(ATR|\Phi, s_{gh})/p(ATR)$$

wherein p is probability; $\Phi, s_{gh}$ is gas hydrate saturation, "ATR" is attribute, and "MC" is model constrained.

5. The computer program product of claim 1, wherein generating a hydrate concentration and distribution estimate comprises applying a maximum a-posteriori (MAP) rule.

6. A method for estimating gas hydrate concentrations in a formation region, the method comprising:
    acquiring well data regarding the formation region;
    generating, via a processor, separate attributes at different porosity and gas hydrate saturations utilizing a rock physics model corresponding to the well data;
    creating, via a processor, individual gas hydrate classes according to the different porosity and gas hydrate saturations based on the population of the separate attributes;
    calculating, via a processor, a probability density function for each of the individual gas hydrate classes;
    creating, via a processor, a joint conditional probability function given the probability density functions for the individual gas hydrate classes for the separate attributes; and
    generating, via a processor, a hydrate concentration and distribution estimate for the formation region.

7. The method of claim 6, wherein the plurality of separate attributes comprises at least two of compression wave impedance, shear wave impedance, bulk density, compression wave velocity and shear wave velocity.

8. The method of claim 6, wherein the joint conditional probability function uses a model-constrained Bayesian inversion.

9. The computer program product of claim 8, wherein the model-constrained Bayesian inversion is the function:

$$p(\Phi, s_{gh}|ATR) = p(\Phi, s_{gh})_{MC} * p(ATR|\Phi, s_{gh})/p(ATR)$$

wherein p is probability; $\Phi, s_{gh}$ is gas hydrate saturation, "ATR" is attribute, and "MC" is model constrained.

10. The method of claim 6, wherein generating a hydrate concentration and distribution estimate comprises applying, via a processor, a maximum a-posteriori (MAP) rule.

11. A data processing system for estimating gas hydrate concentrations comprising:
    a memory; and
    a processor, wherein the processor executes a computer usable program code to:
        generate separate attributes at different porosity and gas hydrate saturations utilizing a rock physics model corresponding to data associated with a formation region;
        create individual gas hydrate classes according to the different porosity and gas hydrate saturations based on the population of the separate attributes;
        calculate a probability density function for each of the individual gas hydrate classes;
        create a joint conditional probability function given the probability density functions for the individual gas hydrate classes for the separate attributes; and
        generate a hydrate concentration and distribution estimate for the formation region.

12. The data processing system of claim 11, wherein the plurality of separate attributes comprises at least two of compression wave impedance, shear wave impedance, bulk density, compression wave velocity and shear wave velocity.

13. The data processing system of claim 11, wherein the joint conditional probability function uses a model-constrained Bayesian inversion.

14. The computer program product of claim 13, wherein the model-constrained Bayesian inversion is the function:

$$p(\Phi, s_{gh}|ATR) = p(\Phi, s_{gh})_{MC} * p(ATR|\Phi, s_{gh})/p(ATR)$$

wherein p is probability; $\Phi, s_{gh}$ is gas hydrate saturation, "ATR" is attribute, and "MC" is model constrained.

15. The data processing system of claim 11, wherein generate a hydrate concentration and distribution estimate comprises apply a maximum a-posteriori (MAP) rule.

* * * * *